United States Patent [19]
Vogelsang

[11] 3,738,333
[45] June 12, 1973

[54] CYLINDER ARRANGEMENT HAVING A PRECOMBUSTION CHAMBER FOR COMBUSTION ENGINES

[75] Inventor: Gustav Vogelsang, Braunschweig, Germany

[73] Assignee: Volkewagenwerk Aktiengesellschaft, Wolfsburg, Germany

[22] Filed: July 9, 1971

[21] Appl. No.: 161,013

[30] Foreign Application Priority Data
July 17, 1970  Germany ............. P 20 35 464.7

[52] U.S. Cl. .................. 123/32 SP, 123/191 A
[51] Int. Cl. ............................... F02b 23/00
[58] Field of Search ............ 123/191 A, 191 S, 123/32 SP

[56] References Cited
UNITED STATES PATENTS

| | | | |
|---|---|---|---|
| 1,691,182 | 11/1928 | Davol | 123/32 SP |
| 1,879,186 | 9/1932 | Goddard | 123/32 SP |
| 3,192,912 | 7/1965 | Stumpfig | 123/191 S |
| 3,502,054 | 3/1970 | Hambric | 123/191 A |
| 3,508,530 | 4/1970 | Clawson | 123/191 S |
| 3,552,370 | 1/1971 | Briggs | 123/191 A |

Primary Examiner—Laurence M. Goodridge
Assistant Examiner—Cort R. Flint
Attorney—Ernest F. Marmorek

[57] ABSTRACT

In a combustion engine having external ignition, a cylinder arrangement comprising a combustion chamber and a precombustion chamber in communication therewith, a fuel injection valve and a spark plug means communicating with the precombustion chamber and lying at a predetermined angle with respect to each other, means lining the precombustion chamber to a predetermined separating point or level in said precombustion chamber and particularly lining the wall portion of the precombustion chamber which lies across the injection valve, the lining means comprising a heat resistant material having a very low heat conducting capability.

3 Claims, 1 Drawing Figure

PATENTED JUN 12 1973 3,738,333
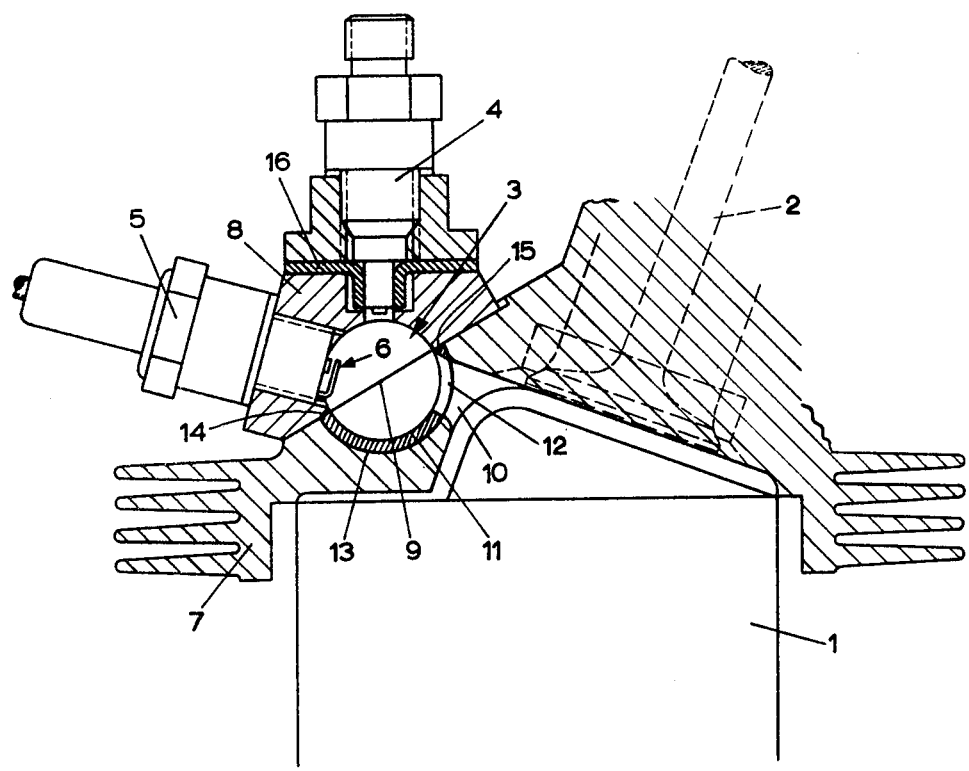
INVENTOR.
GUSTAV VOGELSANG
BY
HIS ATTORNEY.

3,738,333

CYLINDER ARRANGEMENT HAVING A PRECOMBUSTION CHAMBER FOR COMBUSTION ENGINES

FIELD OF THE INVENTION

The present invention relates generally to combustion engines having external ignition and more particularly it relates to a cylinder arrangement for such vehicles which have a combustion chamber and a precombustion chamber connected thereto and into which the fuel injection valve is inserted in an inclined fashion at not more than 90° with respect to a spark plug which protrudes with its electrode into the precombustion chamber.

BACKGROUND OF THE INVENTION

Such cylinder arrangement as the above described type are known from a number of publications and also from machines on the market. The subdivision of the combustion chamber into a combustion chamber per se and into a relatively small precombustion chamber into which the electrodes of the spark plug as well as the injection valve protrude has the advantage that in the region of the electrode of the spark plug an extremely combustible mixture can be located at a desired instant of time, while on the other hand the mixture composition can be controlled in the combustion chamber itself from the viewpoint of a good fuel efficiency and advantageous exhaust gas content. The adding of the necessary excess air, as a rule, while the mixture is in the precombustion chamber, is performed in the combustion chamber by means of a further injection valve or in the case of machines having carburetors, by means of an additional intake valve. The use of an additional injection or intake valve permits also the adding of the fuel mixture into the precombustion chamber and into the combustion chamber itself at different time instants.

SUMMARY OF THE INVENTION

It is, therefore, an object of the present invention to provide a cylinder arrangement for a combustion engine which from the viewpoint of installment as well as ignition relations performs very advantageously.

According to the present invention the cylinder arrangement is characterized in that the cylinder arrangement in the region of the precombustion chamber is subdivided by a separating linear plane traversing the precombustion chamber and the wall portion of the precombustion chamber which lies on the side of the line across the injection valve is provided with a heat resistant lining which has low heat conducting properties.

By the fact that the wall portion of the precombustion chamber lying across the injection valve is provided with a lining from a heat resistant, practically heat barring material, such as a heavy metal, it is attained that the fuel mixture falling on the above mentioned heat resistant material becomes very quickly evaporated and thereby becomes very easily ignited by the spark plug. The special constructive subdivision of the precombustion chamber presents the possibility that the lining is inserted in a very simple manner. It is very advantageous if the subdivision is done in a manner that the separating or dividing line or plane runs along or defines a cover-like member which includes the injection valve and the spark plug. In this embodiment of the present invention the mounting bores for the injection valve and the spark plug can be very easily machined since both of them are placed in a relatively small cover-like member which later becomes screwed into the cylinder block itself.

The lining can be molded into the precombustion chamber; however, in the preferred embodiment of the present invention a prefabricated insert member is used which is screwed into the precombustion chamber or secured thereinto by means of supporting devices. In this embodiment of the present invention it is advantageous if the cover-like member abuts with pressure surfaces onto the insert which is then forced against the wall portions of the precombustion chamber across the injection valve.

The insertion of the lining according to the present invention becomes especially effective in cases where the cylinder is made from a light metal which conducts the heat very well. In this case then one obtains a cylinder arrangement which in the region of the combustion chamber itself possesses a very good and desirable heat conduction while in the region of the precombustion chamber the temperature becomes retained at such high value that a quick evaporation of the fuel mixture injected can take place.

BRIEF DESCRIPTION OF THE DRAWING

The invention will become more readily apparent from the following description of a preferred embodiment thereof shown, by way of example, in the accompanying drawing, in which:

The single FIGURE illustrates an embodiment of the cylinder arrangement according to the present invention showing only the parts, partly in section, which are essential to the understanding of the invention.

DESCRIPTION OF THE PREFERRED EMBODIMENT

With reference to the single FIGURE it is seen that the cylinder arrangement comprises the combustion chamber 1 itself which by means or through an inlet valve 2 or an injection valve is supplied by a fuel mixture having such an excess air number therein which assures the desired optimum use of the mixture in the combustion process while a precombustion chamber 3 is provided into which the injection valve 4 opens for the insertion of a highly combustible mixture and also into which the spark plug 5 with its electrode arrangement 6 protrudes. The precombustion chamber 3 in this embodiment is formed in such a manner that onto the cylinder block 7 itself a cover-like member 8 is screwed on which there are provided receiving bores for the injection valve 4 and the spark plug 5. The axis of both of such receiving bores define an angle of less than 90° with respect to each other. As seen in the FIGURE, a separating plane 9 passes between the cylinder block 7 itself and the cover-like member 8 so that it cuts into half the disc-like cross section of the precombustion chamber 3. The separating plane 9 runs also between the injection valve 4 and the spark plug 5 and also between the connecting passage 10 between the precombustion chamber 3 and the combustion chamber 1.

The wall portion which lies across the injection valve 4 in the precombustion chamber 3 is provided with a lining from a heavy metal which in the present embodiment is represented as an insert 11. Such insert 11 fits to the shape of the wall of the precombustion chamber, that is, it is also provided with an aperture 12 which connects the space of the precombustion chamber with the combustion chamber 1 itself and which has a cross section in the shape of an annulus. The supporting of the insert 11 in the present embodiment is accomplished by an appropriate formation of the cover-like member 8 which, incidentally, has a diameter which is smaller by twice the thickness of the insert 11 than the diameter of the wall 13 defining the precombustion chamber 3 in the cylinder block itself. As a result, in the cover-like member 8 along the separating plane 9 pressure surfaces 14 and 15 are created which force the insert 11 against the wall portion 13.

As can be seen without difficulty the present invention achieves an unlimited freedom regarding the shaping of the precombustion chamber 3. It can, as shown in the illustrated embodiment, have the shape of a cylinder; however, the construction of a spherical or a chamber limited by the flat surfaces is also within the scope of the present invention. The present invention is also applicable to engines having a rotating piston. In order that the injection valve could be protected it is desirable, as shown at 16, to provide a heat barrier in the form of an intermediate lining.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a combustion engine having external ignition, a cylinder arrangement comprising a combustion chamber and a precombustion chamber in communication therewith;

said precombustion chamber including a disconnectable cover-like top portion defining a separating plane with the remaining portion of said precombustion chamber, a fuel injection valve and a spark plug supported by said disconnectable top portion and communicating with said precombustion chamber and lying at a predetermined angle within 90 degrees with respect to each other;

insert means lining said remaining portion of said precombustion chamber at least directly opposite said injection valve whereby fuel injected onto the lining is quickly vaporized said insert means being of a heat resistant material having low heat conductivity, and said top portion including pressure surfaces formed thereon and abutting against said insert means to force said insert means against the wall of said remaining portion of said precombustion chamber.

2. The combination as claimed in claim 1, wherein said lining means comprises a heavy metal.

3. The combination as claimed in claim 1, wherein said cylinder arrangement is made from a light metal.

* * * * *